(12) United States Patent
Su et al.

(10) Patent No.: US 10,867,762 B2
(45) Date of Patent: Dec. 15, 2020

(54) KEYBOARD KEY HAVING A HAPTIC ELASTIC PIECE ABUTTING THE RETURN SPRING

(71) Applicants: LITE-ON ELECTRONICS (GUANGZHOU) LIMITED, Guangzhou (CN); Lite-On Technology Corporation, Taipei (TW)

(72) Inventors: Chih-Wen Su, Taipei (TW); Yu-Hsun Chen, Taipei (TW)

(73) Assignees: LITE-ON ELECTRONICS (GUANGZHOU) LIMITED, Guangzhou (CN); Lite-On Technology Corporation, Taipei (TW)

( * ) Notice: Subject to any disclaimer, the term of this patent is extended or adjusted under 35 U.S.C. 154(b) by 0 days.

(21) Appl. No.: 16/656,573

(22) Filed: Oct. 17, 2019

(65) Prior Publication Data

US 2020/0152402 A1 May 14, 2020

(30) Foreign Application Priority Data

Nov. 9, 2018 (CN) .......................... 2018 1 1329577

(51) Int. Cl.
*H01H 13/7073* (2006.01)
*G06F 3/02* (2006.01)

(52) U.S. Cl.
CPC ....... *H01H 13/7073* (2013.01); *G06F 3/0202* (2013.01)

(58) Field of Classification Search
CPC .... H01H 13/84; H01H 13/7073; H01H 13/20; H01H 13/22; H01H 13/85; H01H 2215/03; H01H 2235/006
See application file for complete search history.

(56) References Cited

U.S. PATENT DOCUMENTS

| 3,993,884 A * | 11/1976 | Kondur | H01H 13/705 |
| | | | 200/295 |
| 4,803,362 A * | 2/1989 | Butts | H01H 13/50 |
| | | | 250/229 |
| 9,941,068 B2 * | 4/2018 | Liu | H01H 13/84 |
| 10,529,504 B2 * | 1/2020 | Wu | H01H 13/023 |

* cited by examiner

*Primary Examiner* — Vanessa Girardi
(74) *Attorney, Agent, or Firm* — JCIPRNET

(57) ABSTRACT

A key structure is provided, including a key housing, a keycap, an elastic piece and a spring. The key housing comprises an interfering portion. The keycap is movably assembled to the key housing along a pressing axial direction. The elastic piece is movably assembled to the keycap along the pressing axial direction. The elastic piece comprises a protrusion, and the interfering portion is located on a movement path of the protrusion. The spring abuts between the keycap and the elastic piece. When in an initial position, the protrusion is stopped at the interfering portion. When an external force is applied to the keycap, in a pressing process, the keycap is moved relative to the key housing, and drives the protrusion to surmount and cross over the interfering portion. An elastic restoring force of the elastic piece causes the protrusion to hit the interfering portion to make a sound.

18 Claims, 15 Drawing Sheets

KEYBOARD KEY HAVING A HAPTIC ELASTIC PIECE ABUTTING THE RETURN SPRING

CROSS-REFERENCE TO RELATED APPLICATION

This application claims the priority benefit of China application serial no. 201811329577.1, filed on Nov. 9, 2018. The entirety of the above-mentioned patent application is hereby incorporated by reference herein and made a part of this specification.

BACKGROUND

Technical Field

The disclosure relates to a key structure, particularly to a key structure of a keyboard.

Related Art

In terms of current habits of use of personal electronic devices, the keyboard is one of the indispensable input devices and is used to enter text, symbols or numbers. Furthermore, the keyboard or key set is provided as an input device in applications ranging from consumer electronics used in daily life to large-scale processing equipment used in the industrial sector for the purpose of operating the aforesaid electronics and processing equipment.

However, many defects have been found in structure and performance of the existing keyboards through practical use, and as a result, the keyboards have failed to achieve their best effects and work efficiency in practical applications.

For example, the current keyboards can be roughly classified into mechanical keyboards and membrane keyboards. Advantages of the mechanical keyboard include a long key-pressing stroke, a clear tactile sensation (i.e., haptics feedback) and a unique pressing sound; a disadvantage of the mechanical keyboard is that the sealability is not good, and keys may not work when dust or moisture enters. In contrast, advantages of the membrane keyboard include good sealability and good moisture resistance. However, it cannot achieve the same clear tactile sensation as the mechanical keyboard.

Accordingly, how to provide a keyboard having the aforesaid advantages of both the mechanical keyboard and the membrane keyboard is an issue that needs to be considered and addressed by those skilled in the art.

SUMMARY

An object of the disclosure is to provide a key structure which makes a sound in the process of being pressed, so as to provide a user with a clearer tactile sensation and impressive user experience.

Another object of the disclosure is to provide a keyboard good in both sealability and moisture resistance and having a relatively low cost.

To achieve the above objects, the disclosure provides a key structure including a key housing, a keycap, an elastic piece and a spring. The key housing comprises an interfering portion. The keycap is movably assembled to the key housing along a pressing axial direction. The elastic piece is movably assembled to the keycap along the pressing axial direction. The elastic piece comprises a protrusion, and the interfering portion is located on a movement path of the protrusion. The spring abuts between the keycap and the elastic piece. When in an initial position, the protrusion is stopped at the interfering portion. When an external force is applied to the keycap, in a pressing process, the keycap is moved relative to the key housing and drives the protrusion to surmount and cross over the interfering portion. An elastic restoring force of the elastic piece causes the protrusion to hit the interfering portion to make a sound.

In an embodiment of the disclosure, the keycap comprises an accommodation trough and at least one window. The window is a trough hole and communicates with the accommodation trough. The elastic piece is movably assembled into the accommodation trough along the pressing axial direction. The protrusion is movably located at the window along the pressing axial direction, and the protrusion protrudes outside the accommodation trough via the window.

In an embodiment of the disclosure, the keycap comprises a visor and a hollow column portion. The hollow column portion comprises the accommodation trough and the window. An opening of the accommodation trough faces the key housing, the window faces the visor, and the hollow column portion is movably coupled into the key housing.

In an embodiment of the disclosure, when in the initial position, the protrusion is spaced apart from an upper edge of the window by a first distance.

In an embodiment of the disclosure, in a first stroke of the pressing process, the keycap is moved relative to the key housing by the external force, the protrusion interferes with the interfering portion and stops the elastic piece, the spring is thus compressed and deformed until the upper edge of the window abuts against the protrusion, and the protrusion comprises a second distance relative to a lower edge of the window. In a second stroke of the pressing process, the elastic restoring force of the spring is greater than the magnitude of interference force between the protrusion and the interfering portion, thereby driving the protrusion to surmount and cross over the interfering portion.

In an embodiment of the disclosure, an elastic member and a membrane assembly are further included. The key housing covers the elastic member. The keycap and the elastic piece are disposed corresponding to the elastic member. The membrane assembly is disposed below the elastic member.

In an embodiment of the disclosure, in a third stroke of the pressing process, the external force continuously drives the keycap and the elastic piece to move together and press against the elastic member until abutting the membrane assembly to make an electric switching contact.

In an embodiment of the disclosure, the keycap comprises two windows disposed corresponding to each other. The elastic piece is a U-shaped structure, the protrusion is located at one end of the elastic piece, and the other end of the elastic piece comprises an abutting portion. The elastic piece is movably assembled into the accommodation trough along the pressing axial direction, and the protrusion and the abutting portion are respectively located at the two windows to move along the pressing axial direction.

In an embodiment of the disclosure, the hollow column portion comprises a guiding block, an inner surface of the key housing is provided with a guide slot, and the guiding block is movably coupled to the guide slot.

In an embodiment of the disclosure, the hollow column portion comprises a hook extending outward, and the inner surface of the key housing is provided with a stopper, so that in a restoration process, the hook is buckled to the stopper and prevents the keycap from detaching from the key housing. A direction in which the keycap is moved during the pressing process is opposite to a direction in which the keycap is moved during the restoration process.

In an embodiment of the disclosure, the interfering portion is substantially a rib structure spanning above the guide slot.

In an embodiment of the disclosure, the protrusion includes a first guide inclined surface and a second guide inclined surface that are connected with each other, and a free end of the elastic piece adjacent to the protrusion is bent inward to be substantially parallel to the upper edge of the window.

In an embodiment of the disclosure, the elastic piece further comprises a connecting portion connecting the protrusion with the abutting portion, and the connecting portion covers a portion of the opening of the accommodation trough.

In an embodiment of the disclosure, one end of the spring abuts at the connecting portion and the other end of the spring is sleeved on a convex column of a top inner wall of the keycap.

In an embodiment of the disclosure, the abutting portion is to form an interference block at the upper and lower edges of the window during the pressing process.

In an embodiment of the disclosure, the abutting portion is a slightly U-shaped structure, and a free end of the elastic piece adjacent to the abutting portion is bent upward and almost adheres to an inner wall of the hollow column portion.

The disclosure also provides a keyboard including the aforementioned key structure.

Based on the above, when the key structure is in the initial position, by a movable component including the keycap, the elastic piece and the spring, the protrusion of the elastic piece is stopped at the interfering portion of the key housing. In the pressing process performed by the user applying force to the keycap, the keycap is moved relative to the key housing to drive the protrusion to surmount and cross over the interfering portion of the key housing, and the elastic restoring force of the elastic piece causes the protrusion to hit the interfering portion and make a sound. Accordingly, the key structure can provide the user with clear click feel and tactile sensation during pressing, and can provide significant operational feedback to the user by making a sound through the elastic piece and the key housing.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
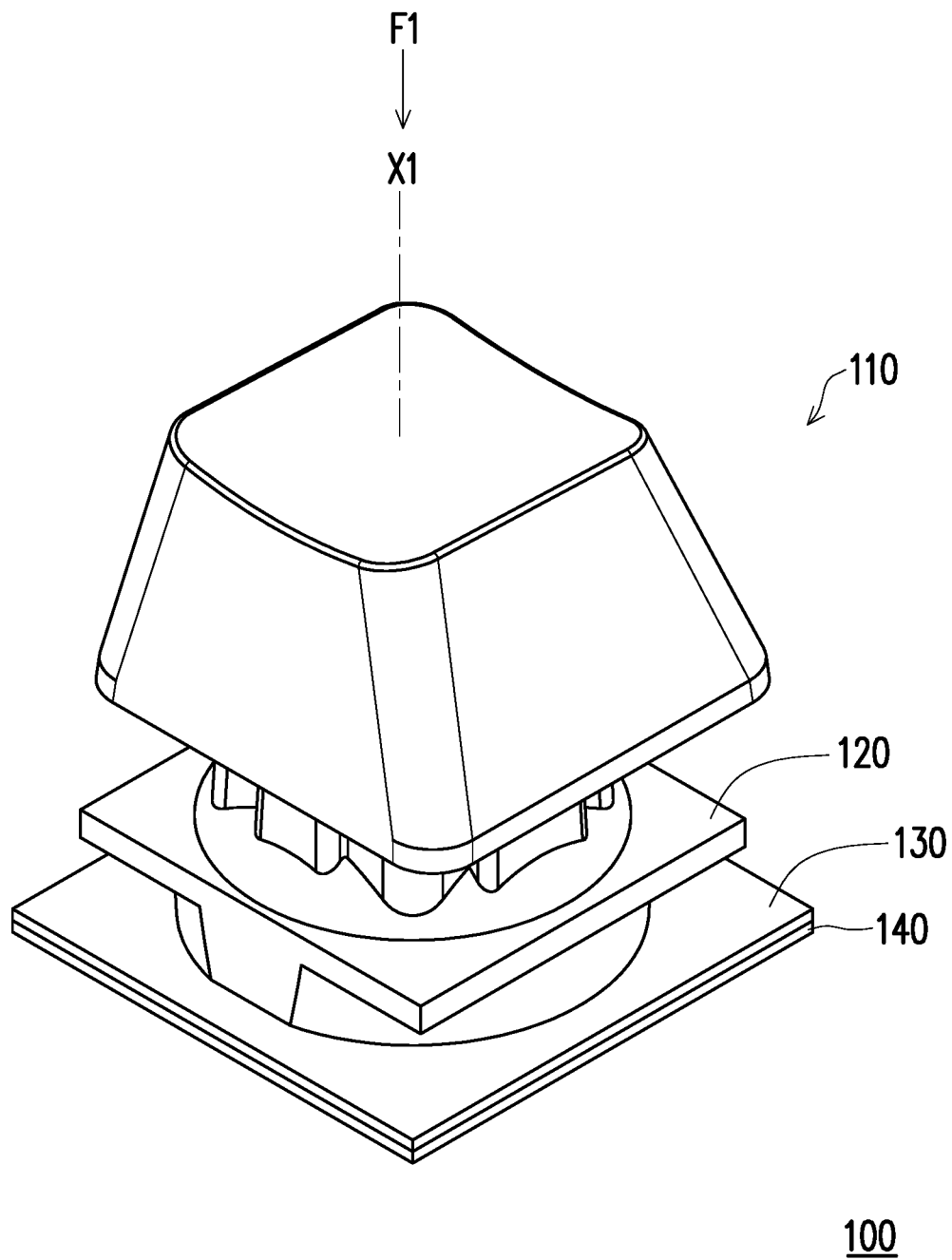
FIG. 1 is a schematic perspective view of a key structure according to an embodiment of the disclosure.

Reference will now be made in detail to the exemplary embodiments of the disclosure, examples of which are illustrated in the accompanying drawings. Wherever possible, the same reference numerals are used in the drawings and the description to refer to the same or like portions.

Figure 2A:
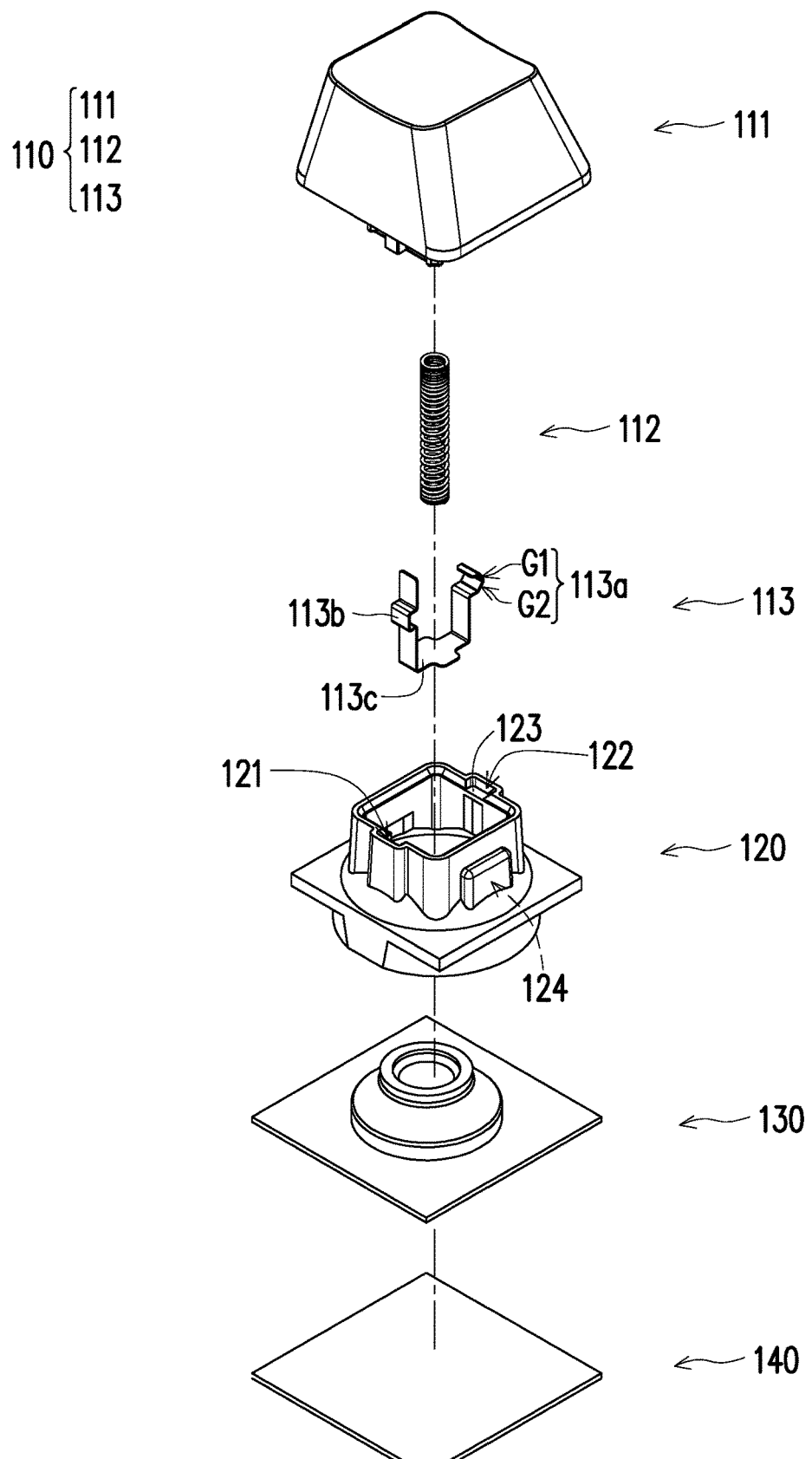
FIG. 2A and FIG. 2B respectively illustrate exploded views of the key structure of FIG. 1 at different viewing angles.
Figure 2B:
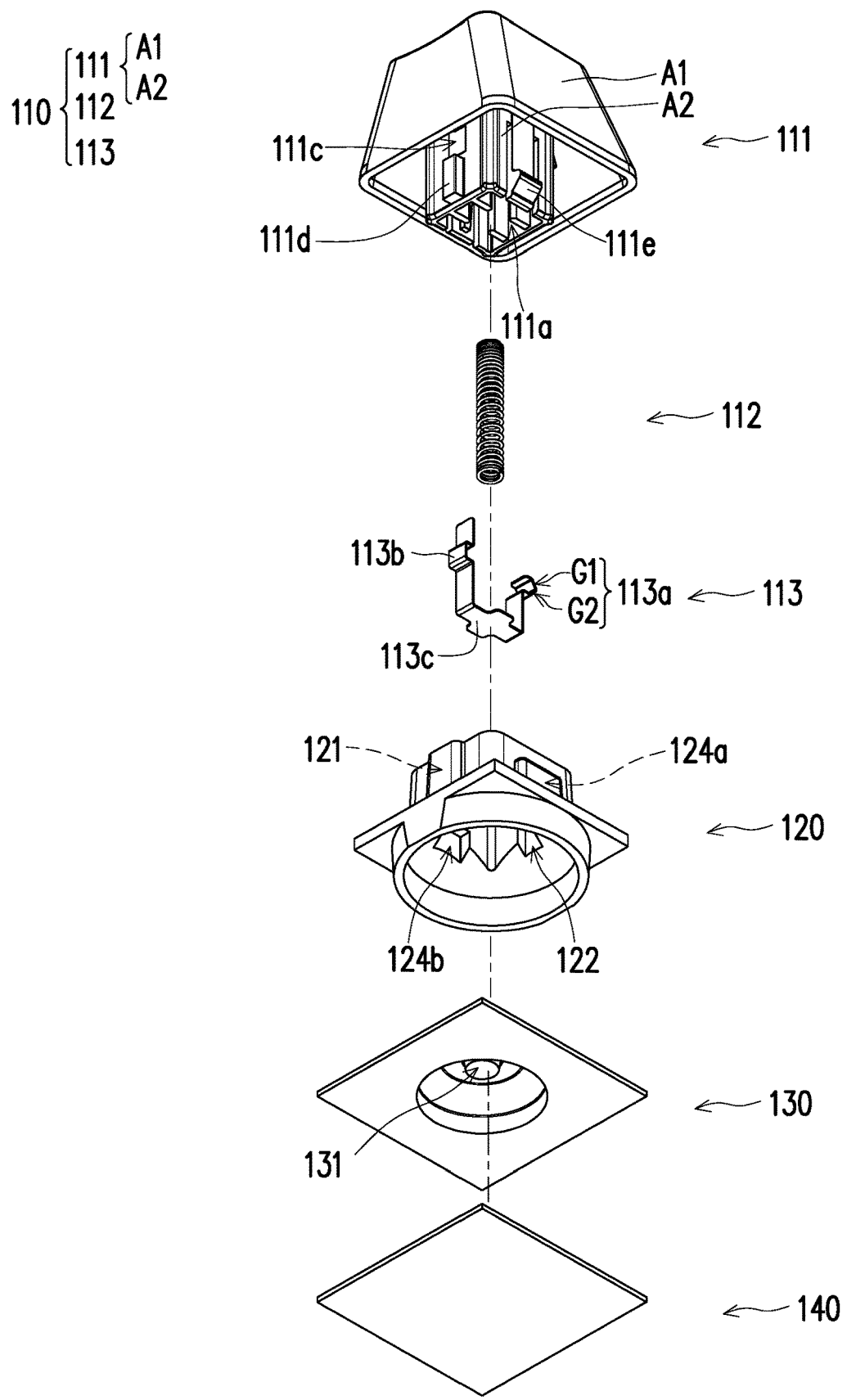
Figure 2C:
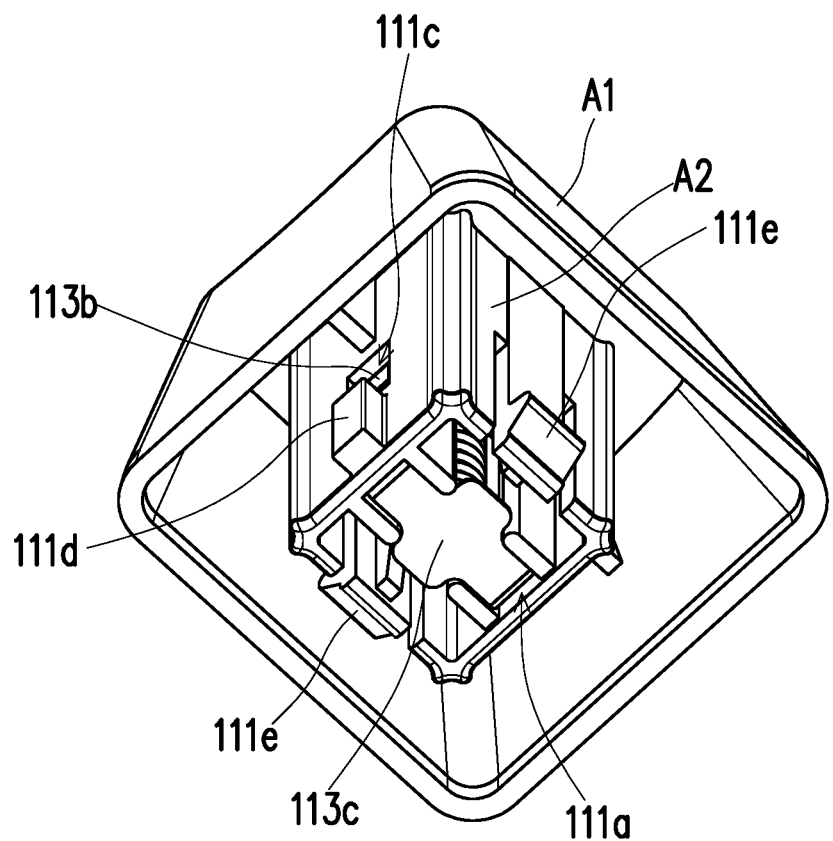
FIG. 2C and FIG. 2D respectively illustrate schematic views of a keycap component and a key housing at different viewing angles.
Figure 2C:
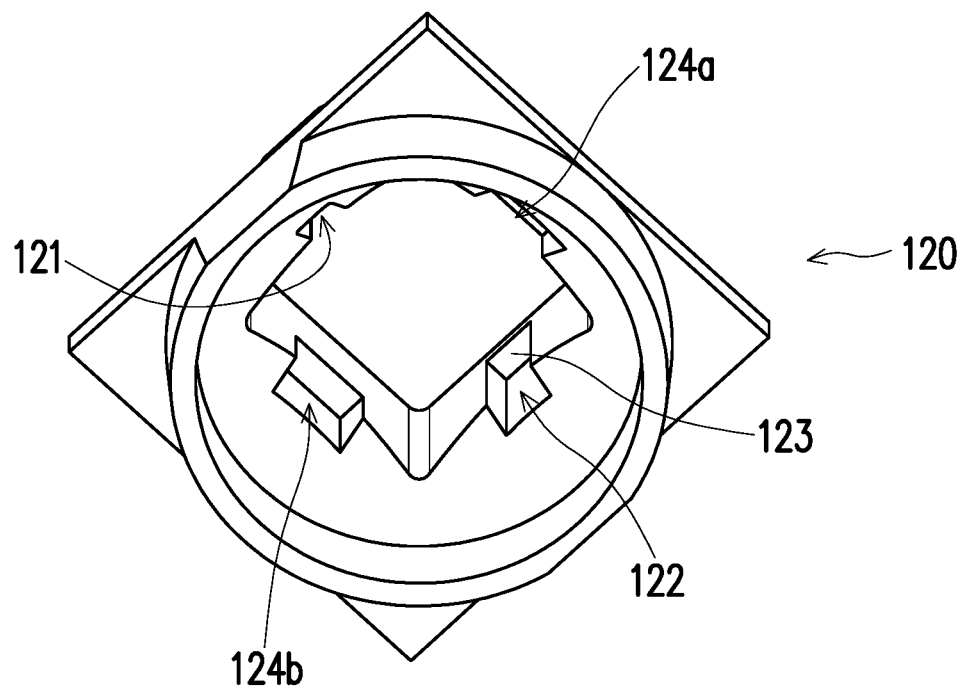
Figure 2D:
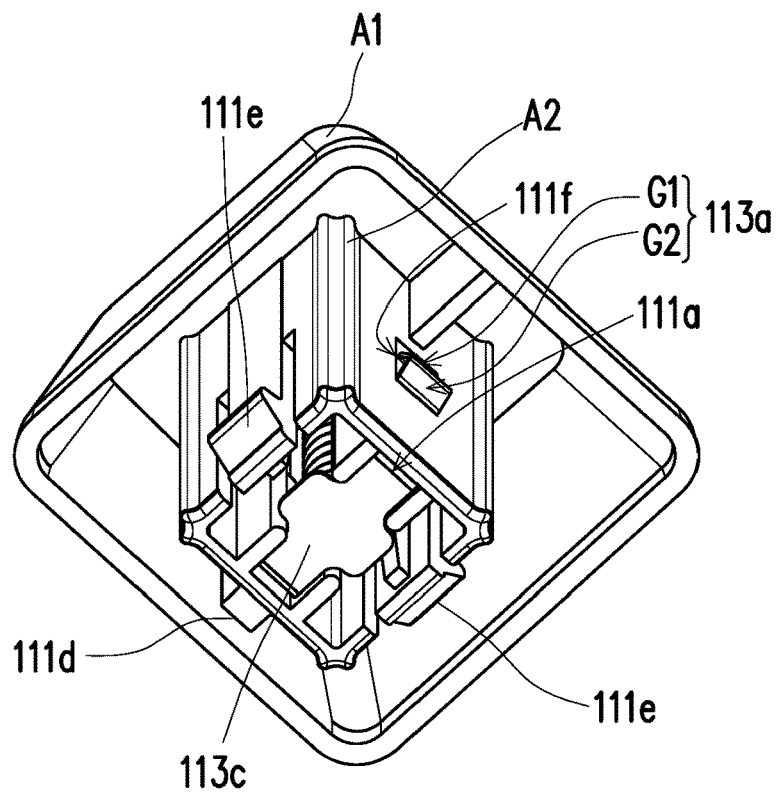
Figure 2D:
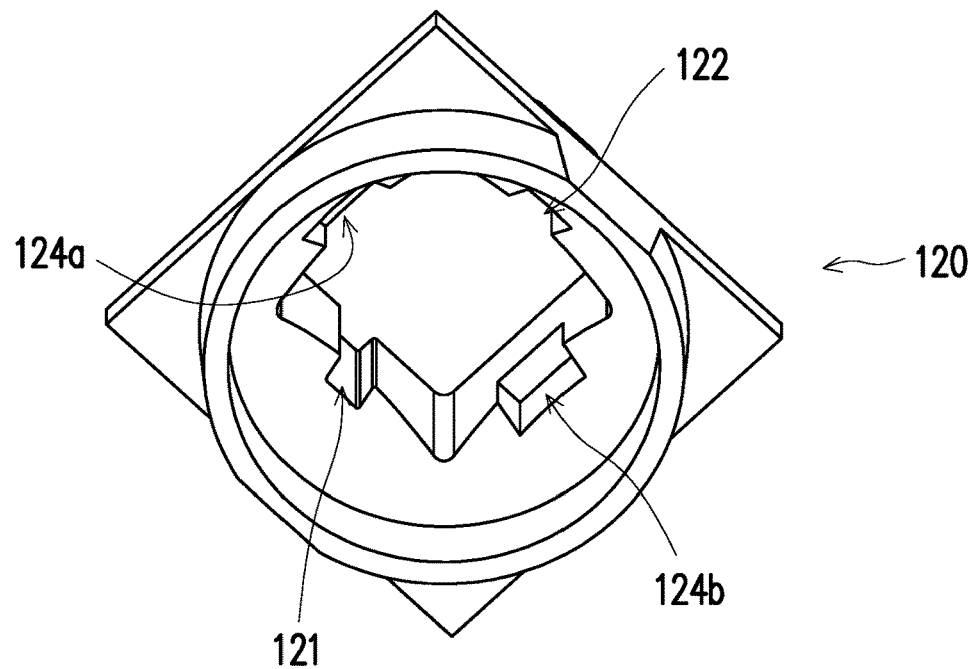

FIG. 1 is a schematic perspective view of a key structure according to an embodiment of the disclosure. FIG. 2A and FIG. 2B illustrate exploded views of the key structure of FIG. 1 at different viewing angles. FIG. 2C and FIG. 2D respectively illustrate schematic views of a keycap component and a key housing at different viewing angles. It is noted that, although a single key structure is described herein as an example, the disclosure is not limited thereto.

Referring to FIG. 1, FIG. 2A, FIG. 2B and FIG. 2C together, in the present embodiment, a key structure 100 is suitable for a membrane keyboard, and includes a keycap component 110, a key housing 120, an elastic member 130, and a membrane assembly 140, wherein the keycap component 110 includes a keycap 111, a spring 112 and an elastic piece 113. The key housing 120 is in the form of a hollow tube and comprises an interfering portion 123. The keycap 111 is movably assembled to the key housing 120 along a pressing axial direction X1. The elastic piece 113 comprises a protrusion 113a, an abutting portion 113b, and a connecting portion 113c connecting the protrusion 113a with the abutting portion 113b, and the elastic piece 113 is movably assembled to the keycap 111 along the pressing axial direction X1. The protrusion 113a of the elastic piece 113 is disposed corresponding to the interfering portion 123; in other words, the interfering portion 123 is located on a movement path of the protrusion 113a. The spring 112 abuts between the keycap 111 and the elastic piece 113. The elastic member 130 is disposed on the membrane assembly 140, the key housing 120 covers the elastic member 130 such as a rubber dome, and the keycap 111 and the elastic piece 113 are disposed corresponding to each other above the elastic member 130. In the embodiment, the membrane assembly 140 includes a first membrane having an electrical circuit provided on a surface thereof, a second membrane having electrical circuit provided on a surface thereof, the first and second membranes being arranged such that the electrical circuits of each membrane are facing each other, and means for permitting selective electrical connection between the electrical circuits of the first and second membranes. When the key structure 100 is pressed by an external force F1 (that is, a pressing process), the keycap component 110 is moved toward the key housing 120 to press against and deform the elastic member 130, until the deformed elastic member 130 further drives, through a trigger portion 131 thereof, corresponding electrode points (not shown) of the membrane assembly 140 to be abutted each other to make an electric switching contact, which causes the membrane assembly 140 to produce a respective electrical signal and achieve a triggered state. Then, when the external force F1 is removed, an elastic restoring force of the elastic member 130 drives the keycap component 110 to be restored (that is, a restoration process); meanwhile, the corresponding electrode points of the membrane assembly 140 move away from each other and resumes its untriggered state. This is a driving method of the membrane keyboard and has been known from the prior art. Therefore, the same parts as those in the prior art will not be described in detail.

Figure 3A:
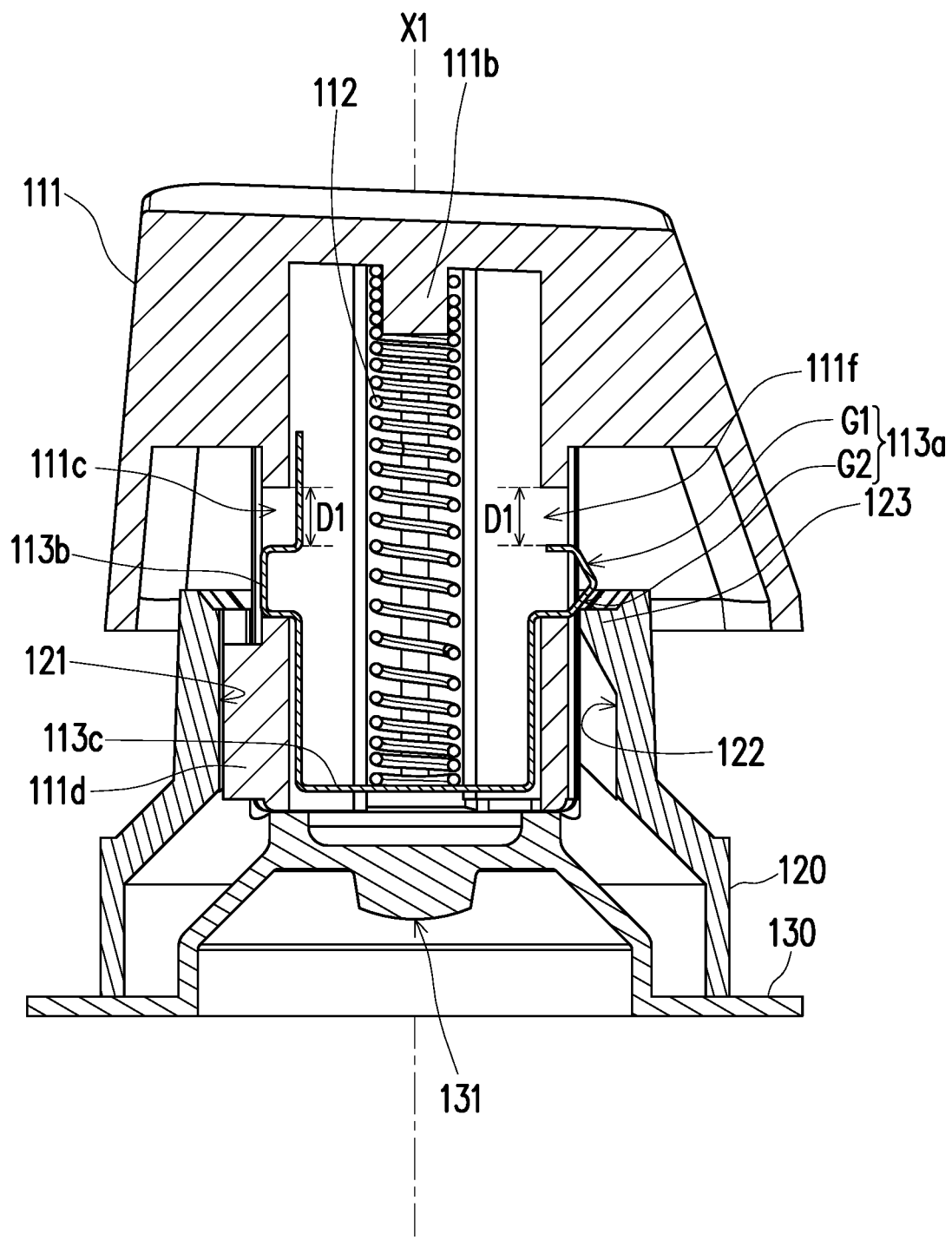
FIG. 3A to FIG. 3E illustrate cross-sectional views of a key structure during a pressing process.

As mentioned above, to enable the membrane keyboard to have the characteristics of the mechanical keyboard, the key structure 100 of the present embodiment achieves the desired effect through a configuration and an adaption of the keycap component 110 and the key housing 120. FIG. 2C and FIG. 2D respectively illustrate schematic views of a keycap component and a key housing at different viewing angles. FIG. 3A to FIG. 3E illustrate cross-sectional views of a key structure during a pressing process, wherein the membrane assembly 140 is omitted from FIG. 3A to FIG. 3E. Referring first to FIG. 2A to FIG. 2D, in the present embodiment, the keycap 111 is further divided into a visor A1 and a hollow column portion A2, wherein the hollow column portion A2 comprises an accommodation trough 111a and windows 111c and 111f. An opening of the accommodation trough 111a faces the key housing 120 and the elastic member 130, and the windows 111c and 111f are through holes and communicate with the accommodation trough 111a. In addition, the windows 111c and 111f are opposed to each other and each face the visor A1. The elastic piece 113 is movably assembled into the accommodation trough 111a along the pressing axial direction X1, and the protrusion 113a and the abutting portion 113b thereof are respectively located at the windows 111f and 111c. In addition, as shown in FIG. 3A, the spring 112 is located inside the accommodation trough 111a and comprises one end sleeved on a convex column 111b of a top inner wall of the keycap 111 to be positioned; meanwhile, the other end of the spring 112 abuts at the connecting portion 113c of the elastic piece 113 and is disposed between the convex column 111b and the connecting portion 113c.

Further, a material of the elastic piece 113 is, for example, metal or transparent plastic. The elastic piece 113 comprises a substantially U-shaped structure, wherein one end is provided with the protrusion 113a extending outward, the other end is provided with the abutting portion 113b extending outward, and the above two are connected by the connecting portion 113c. Preferably, the protrusion 113a and the abutting portion 113b are disposed corresponding to each other. In the present embodiment, the protrusion 113a includes a first guide inclined surface G1 (or a curved surface) and a second guide inclined surface G2 (or a curved surface) that are connected with each other, and a free end of the elastic piece 113 adjacent to the protrusion 113a is bent inward to be substantially parallel to an upper edge of the window 111f. The abutting portion 113b may be continuously bent to have, for example, a slightly ⊏-shaped structure, and a free end of the elastic piece 113 adjacent to the abutting portion 113b is bent upward and almost adheres to an inner wall of the hollow column portion A2. When the elastic piece 113 is assembled into the accommodation trough 111a, the protrusion 113a is movably located at the window 111f along the pressing axial direction X1, and the protrusion 113a partially protrudes outside the accommodation trough 111a via the window 111f. Similarly, the abutting portion 113b is movably located at the window 111c along the pressing axial direction X1, and causes the connecting portion 113c to cover a portion of the opening of the accommodation trough 111a. In other words, the elastic piece 113 is substantially movably sleeved inside the hollow column portion A2 of the keycap 111 along the pressing axial direction X1. Preferably, a position limiting structure is formed inside the hollow column portion A2 to prevent the spring 112 and the elastic piece 113 from deviating from the pressing axial direction X1 during the assembly and pressing processes. However, it should be noted that the protrusion 113a substantially protrudes outside the accommodation trough 111a via the window 111f, while the abutting portion 113b does not protrude from the window 111c and is only required to form an interference block at upper and lower edges of the window 111c during a pressing stroke. Since the protrusion 113a and the abutting portion 113b have significantly different shapes, for the windows 111f and 111c of the hollow column portion A2, during a relative movement of the elastic piece 113 and the keycap 111 along the pressing axial direction X1, the bending surface of the abutting portion 113b is different from the first guide inclined surface G1 and the second guide inclined surface G2 of the protrusion 113a. Therefore, the abutting portion 113b obviously generates interference and stopping effects with the window 111c, so as to prevent the elastic piece 113 from detaching from the accommodation trough 111a.

Referring again to FIG. 2C and FIG. 2D, the hollow column portion A2 of the present embodiment comprises a guiding block 111d, and an inner surface of the key housing 120 is provided with a guide slot 121. When the hollow column portion A2 of the keycap 111 is assembled to the key housing 120, the guiding block 111d is movably coupled to the guide slot 121 along the pressing axial direction X1, so that the keycap 111 can be smoothly movably sleeved on the key housing 120 along the pressing axial direction X1, and the hollow column portion A2 abuts against the elastic member 130. The hollow column portion A2 further comprises two hooks 111e extending outward and disposed opposed to each other, and the inner surface of the key housing 120 is provided with two stoppers 124a and 124b corresponding to each other, so that in the restoration process, the hook 111e can be buckled to the stoppers 124a and 124b, thereby preventing the keycap 111 from detaching from the key housing 120. Here, a direction in which the keycap 111 is moved during the pressing process is opposite a direction in which the keycap 111 is moved during the restoration process, which will be further described later.

Referring to FIG. 3A to FIG. 3E, the process shown is the pressing process of the key structure 100 due to the pressing by the external force F1 (the reverse is the restoration process), that is, a process during which the keycap component 110 is moved in multiple stages from top to bottom. Please refer first to FIG. 3A which shows a state in which the external force F1 has not been applied. It is clear from the drawing that in the initial state, at this moment, a notch of the elastic piece 113 faces a top end of the keycap 111, and the spring 112 is located in the notch of the elastic piece 113, the two ends of the spring 112 respectively abut between the convex column 111b and the connecting portion 113c of the elastic piece 113, and the protrusion 113a of the elastic piece 113 is kept at a first distance D1 from the upper edge of the window 111f. In the present embodiment, preferably, the abutting portion 113b is also kept at the first distance D1 from the upper edge of the window 111c, and since the abutting portion 113b is stopped at the lower edge of the window 111c, the elastic piece 113 can remain in the current initial position. However, the disclosure is not limited thereto.

Figure 3B:
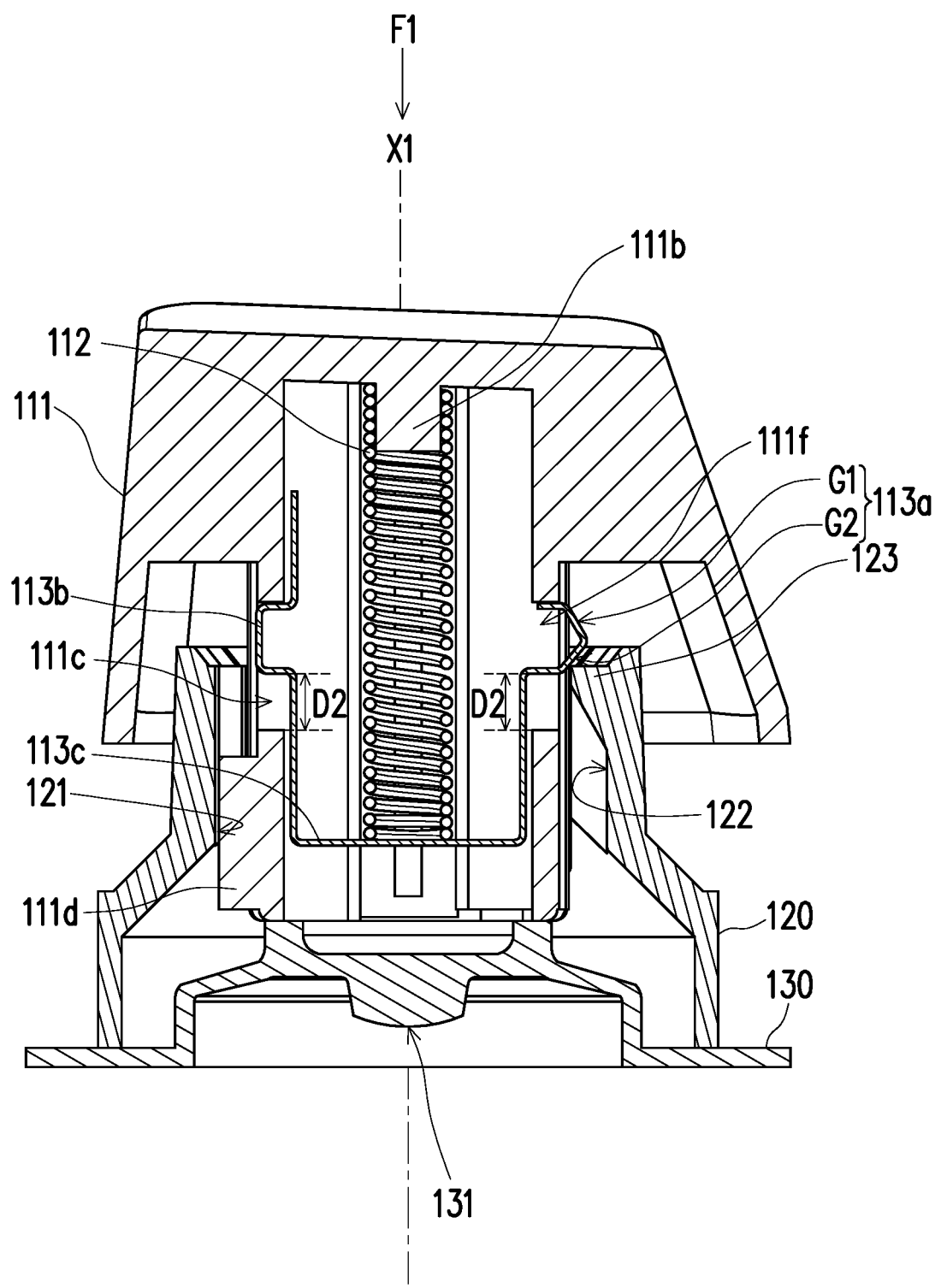

Next, referring to FIG. 2A, FIG. 2C and FIG. 3B together, it should be noted that, as shown in FIG. 2A, the key housing 120 further comprises a guide slot 122 opposed to the guide slot 121. Moreover, the interfering portion 123 is substantially a rib structure spanning above the guide slot 122, and is also located on the movement path of the protrusion 113a of the elastic piece 113. Accordingly, as shown from FIG. 3A to FIG. 3B, when the keycap 111 is pressed by the external force F1 and moved toward the key housing 120, the elastic member 130 is pressed against by the hollow column portion A2 of the keycap 111 and is thus compressed. However, the protrusion 113a interferes with the interfering portion 123 and thus stops the elastic piece 113 from moving downward, and as a result, the spring 112 between the keycap 111 and the elastic piece 113 is compressed and deformed. In other words, the magnitude of interference (interference force) between the protrusion 113a and the interfering portion 123 at this moment is greater than the elastic restoring force of the spring 112 being compressed. At this moment, it is regarded as a first stroke of the pressing process that the keycap 111 is moved the first distance D1 along the pressing axial direction X1, but the elastic piece 113 is limited by the interfering portion 123 of the key housing 120 and cannot move with the keycap 111. Thus, when the first stroke is completed, the protrusion 113a substantially comprises a second distance D2 relative to the lower edge of the window 111f (preferably, the abutting portion 113b also comprises the second distance D2 relative to the lower edge of the window 111c); meanwhile, the abutting portion 113b is stopped at the upper edge of window 111c such that the elastic piece 113 can remain in its position. In the present embodiment, the first distance D1 is substantially equal to the second distance D2, but is not limited thereto. In addition, it is particularly noted that a side of the interfering portion 123 facing the keycap 111 is substantially planar in order to interfere with the protrusion 113a; a side of the interfering portion 123 away from the keycap 111 is a guiding inclined plane configured to comply with the first guide inclined surface G1 of the protrusion 113a.

Figure 3C:
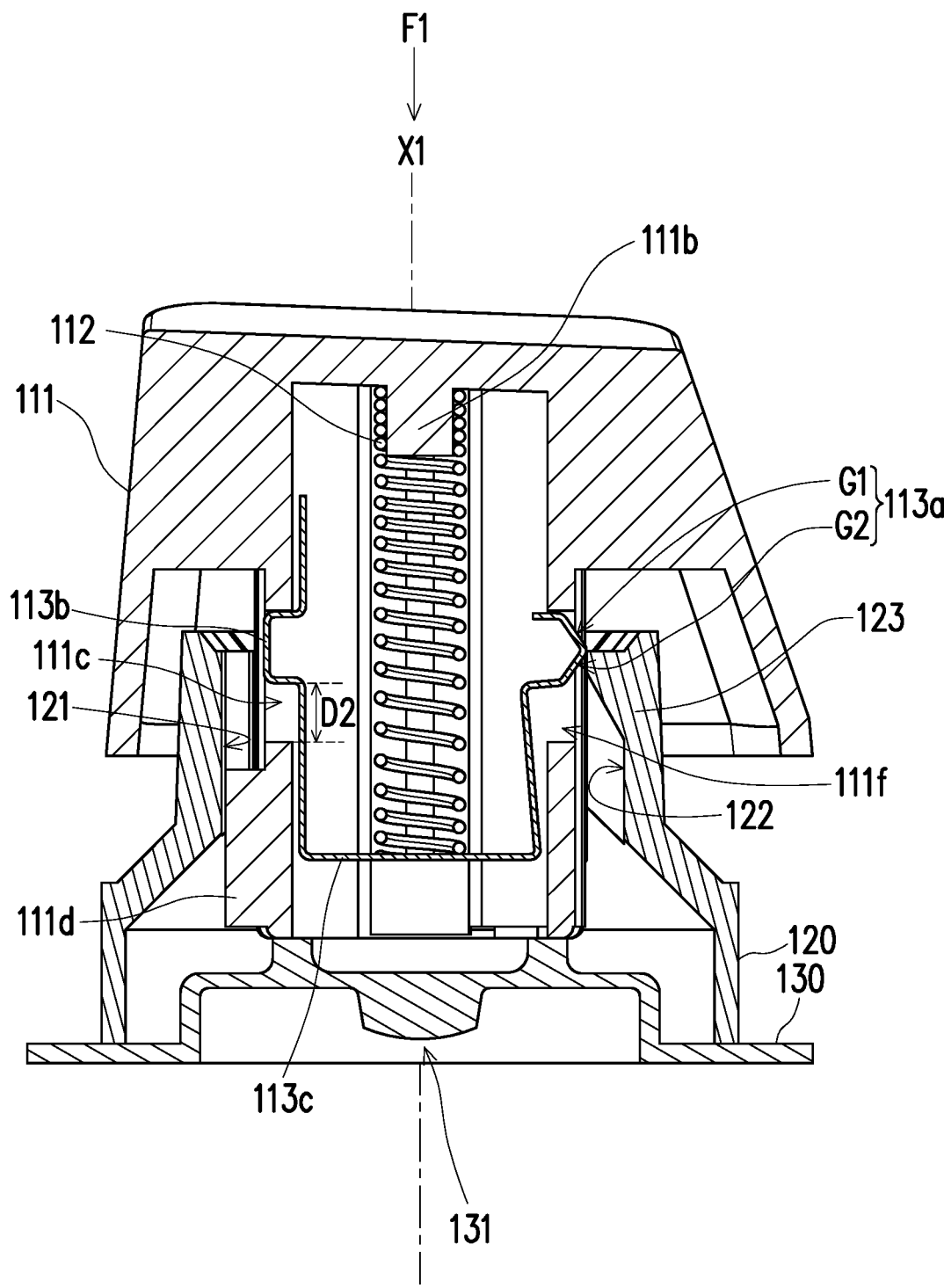

Next, referring to FIG. 3B and FIG. 3C together, in which a second stroke of the pressing process is shown. At this moment, the external force F1 is continuously applied to the keycap 111, thereby driving the keycap 111 to be continuously moved downward, and the protrusion 113a of the elastic piece 113 is driven by the external force F1 to ride on the interfering portion 123 and is gradually contracted inward and deformed. Once the position and state shown in FIG. 3C are reached, it means that the spring 112 has been compressed to the limit, and the elastic restoring force accumulated by the spring 112 by being gradually compressed is greater than the magnitude of interference between the protrusion 113a and the interfering portion 123, causing the elastic piece 113 to change from the state in FIG. 3C to the state in FIG. 3D. That is, an elastic force of the spring 112 is capable of driving the protrusion 113a of the elastic piece 113 to surmount and cross over the interfering portion 123 and hit the interfering portion 123 to make a sound. In other words, the second stroke of the present embodiment includes a first sub stroke dominated by the external force F1, namely the process of FIG. 3B to FIG. 3C, and a second sub stroke dominated by the elastic force of the elastic piece 113, namely the process of FIG. 3C to FIG. 3D.

That is, since a portion of the protrusion 113a facing the interfering portion 123 is an inclined plane, the elastic piece 113 can be pressed against by the interfering portion 123 at the protrusion 113a and is deformed and contracted inward (the elastic piece 113 is deformed and moved toward the spring 112 at the protrusion 113a). After the protrusion 113a is moved downward and has crossed over the interfering portion 123, the elastic force of the elastic piece 113 drives the protrusion 113a to be restored and to hit the interfering portion 123 so as to make a sound.

Figure 3D:
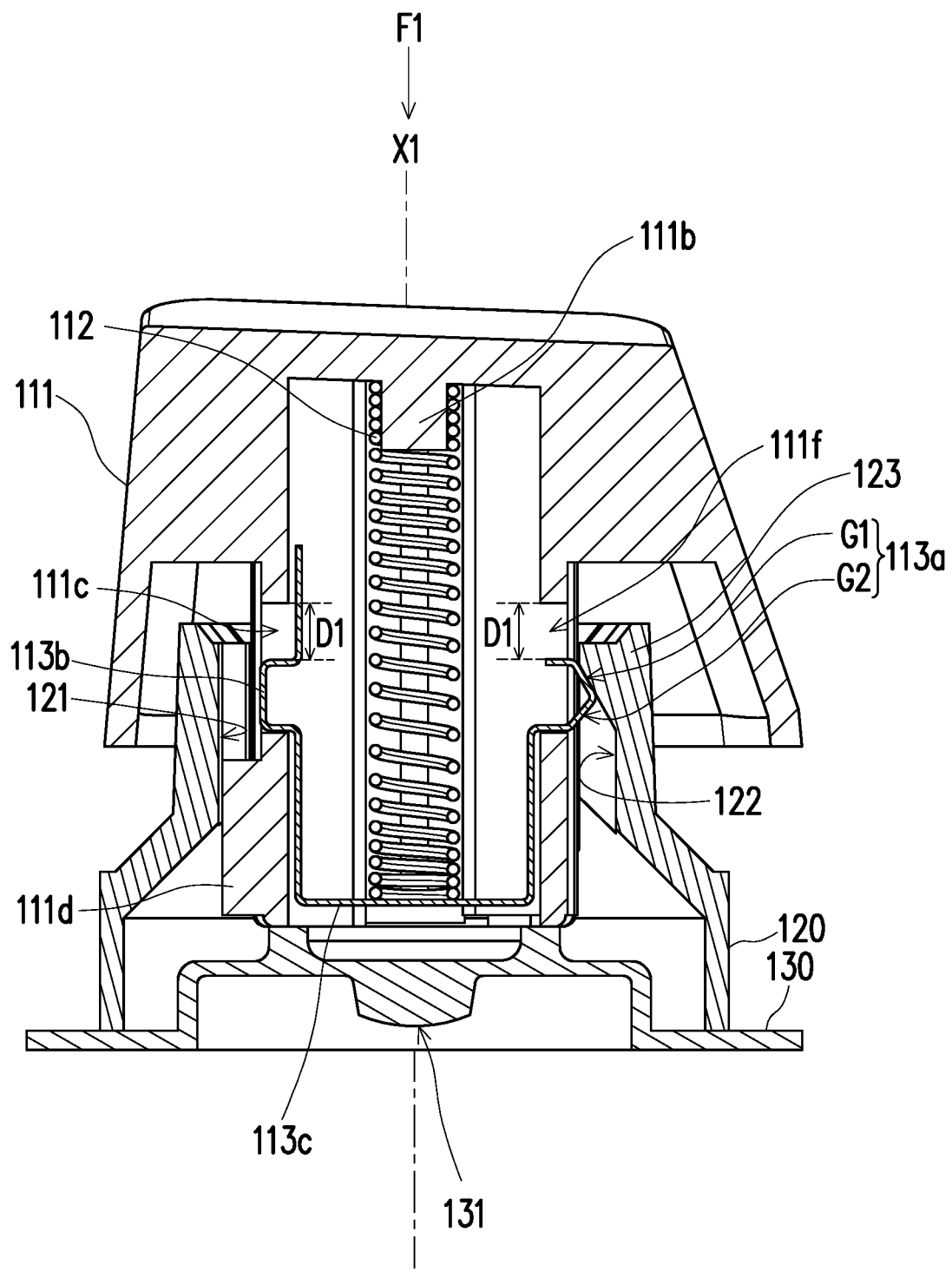

As shown in FIG. 3D, when the elastic piece 113 is driven by the spring 112 and moved downward, it is restored to the same corresponding position relative to the keycap 111, that is, the protrusion 113a is restored to the state similar to that shown in FIG. 3A and is again kept at the first distance D1 from the upper edge of the window 111f.

Figure 3E:
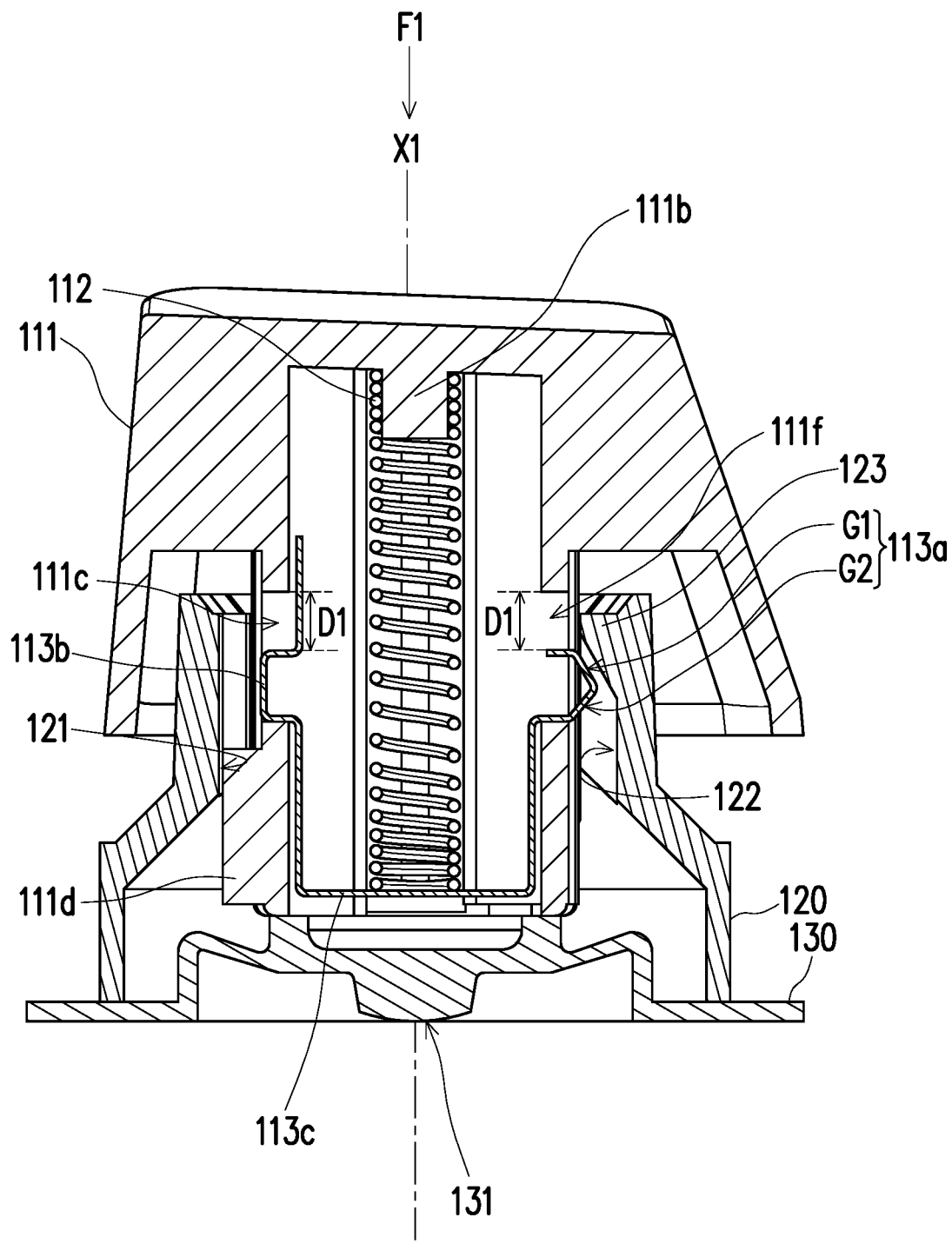
Figure 4A:
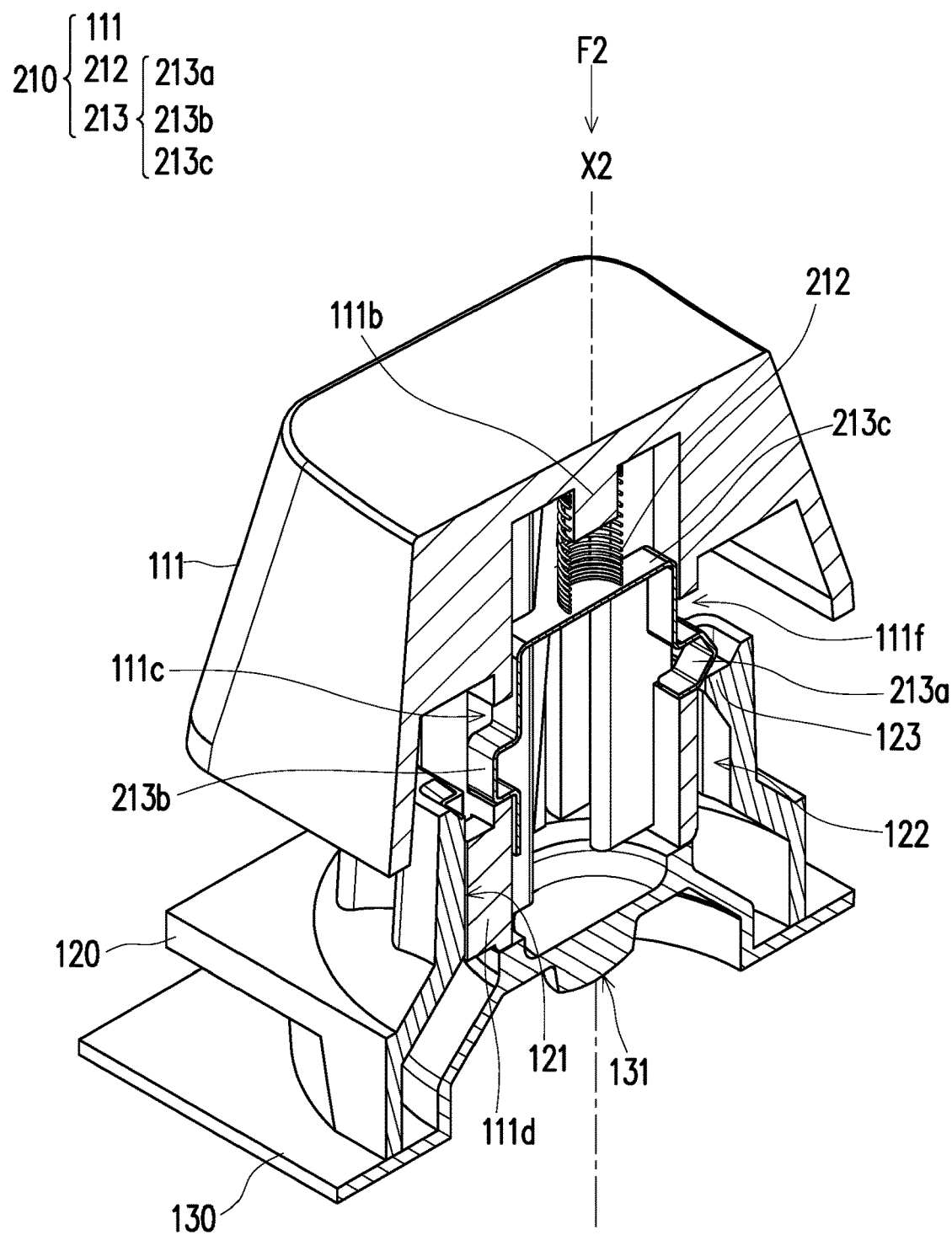
FIG. 4A to FIG. 4E illustrate cross-sectional views of a key structure during a pressing process according to another embodiment.
Figure 4B:
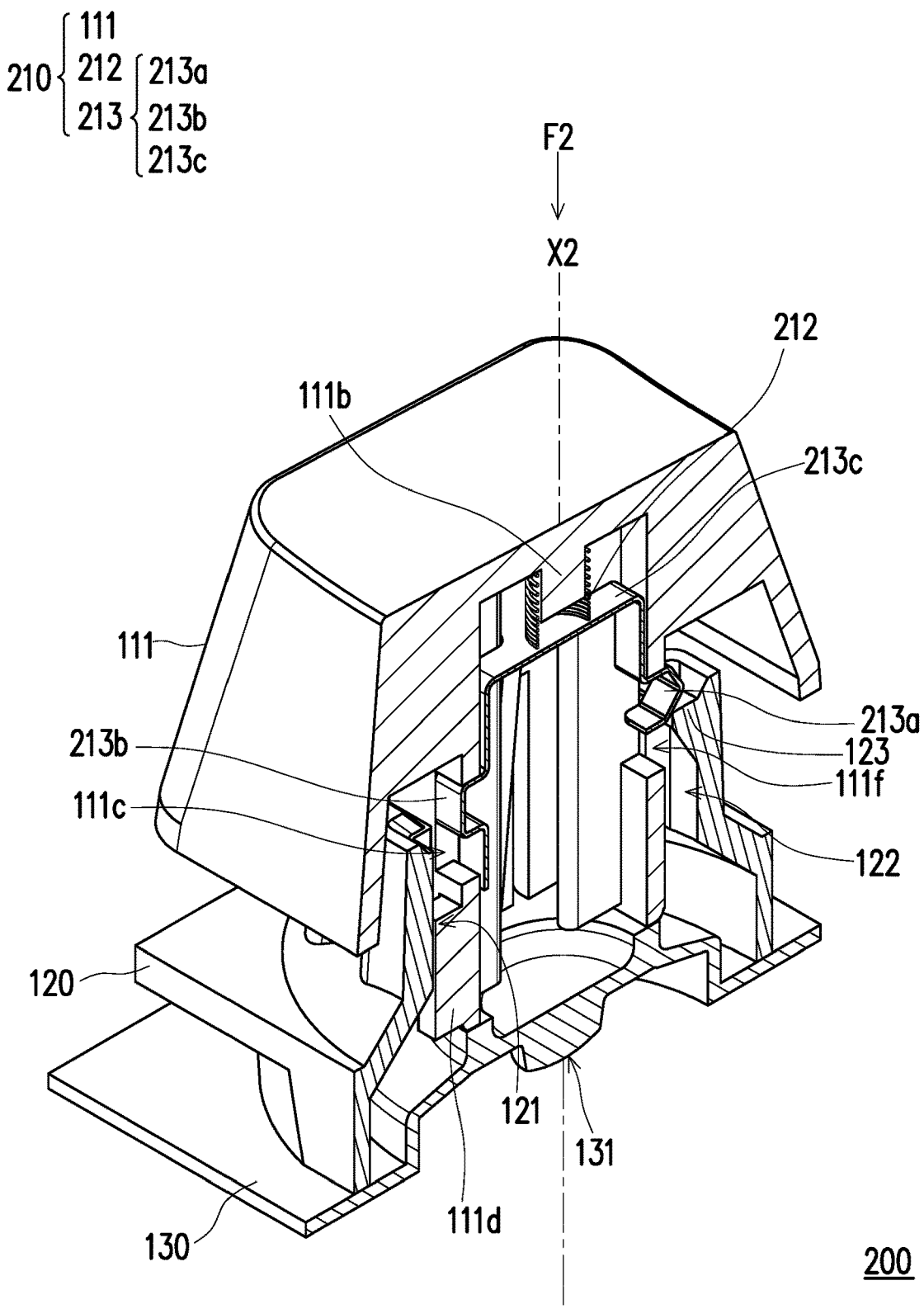
Figure 4C:
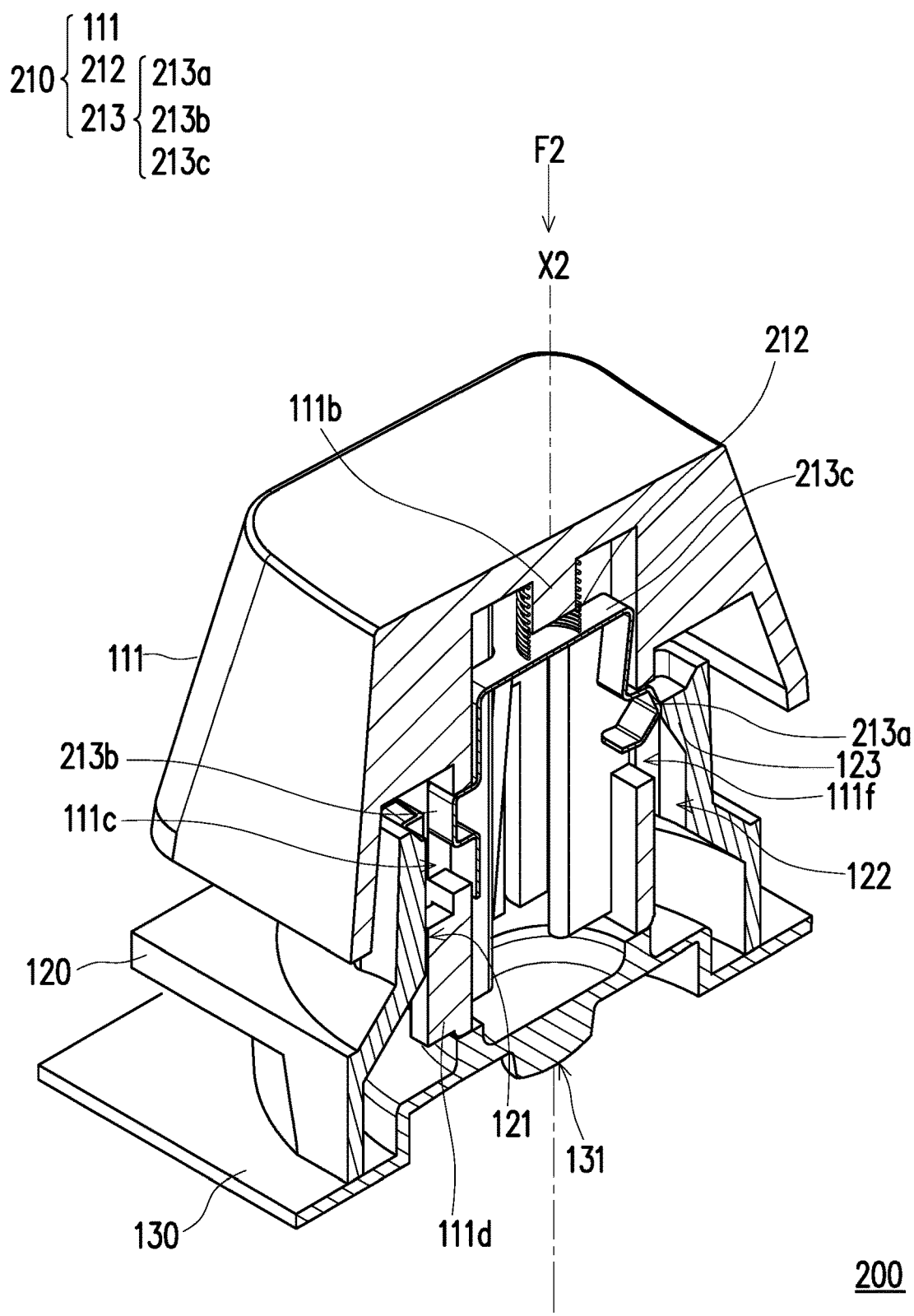
Figure 4D:
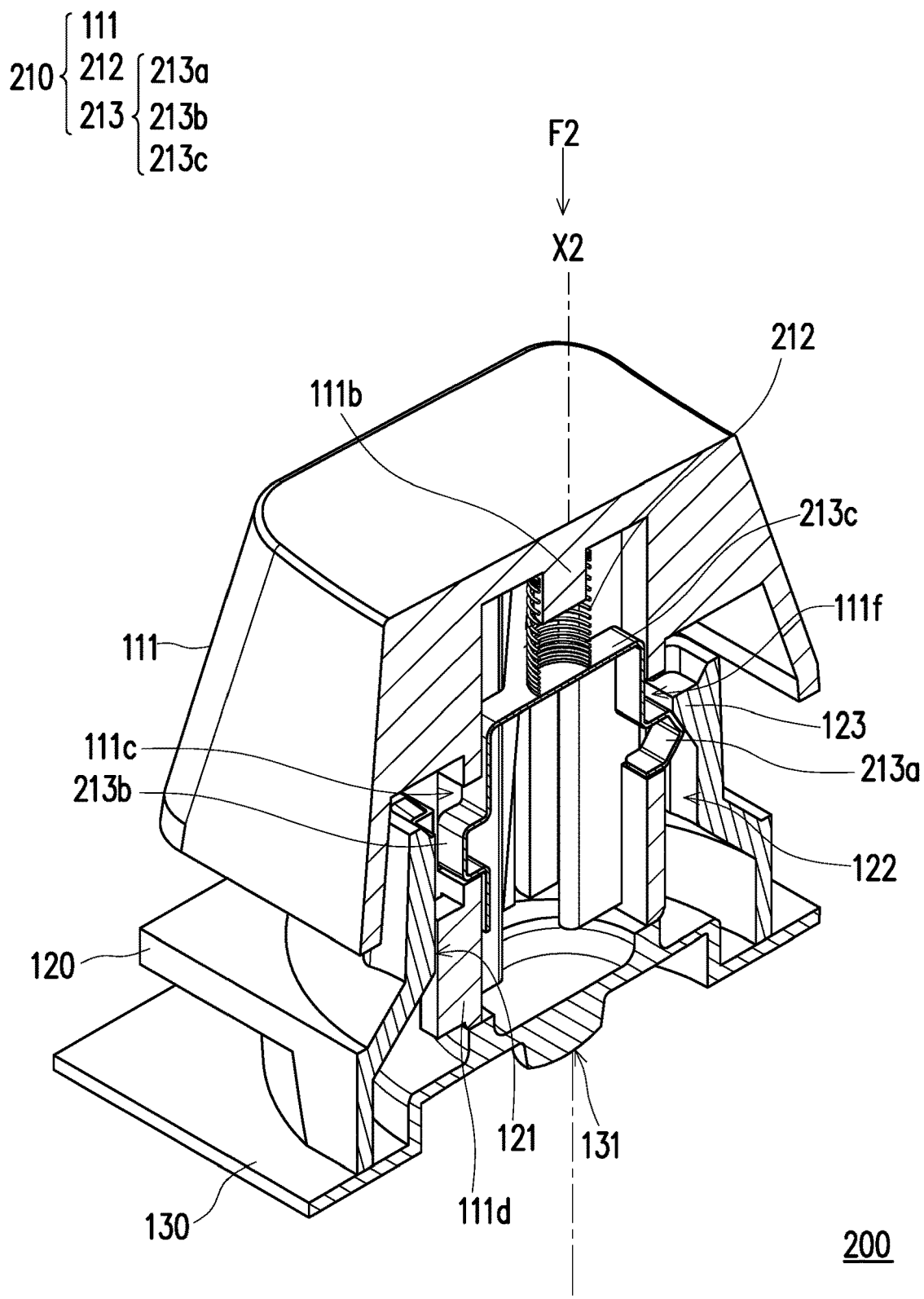
Figure 4E:
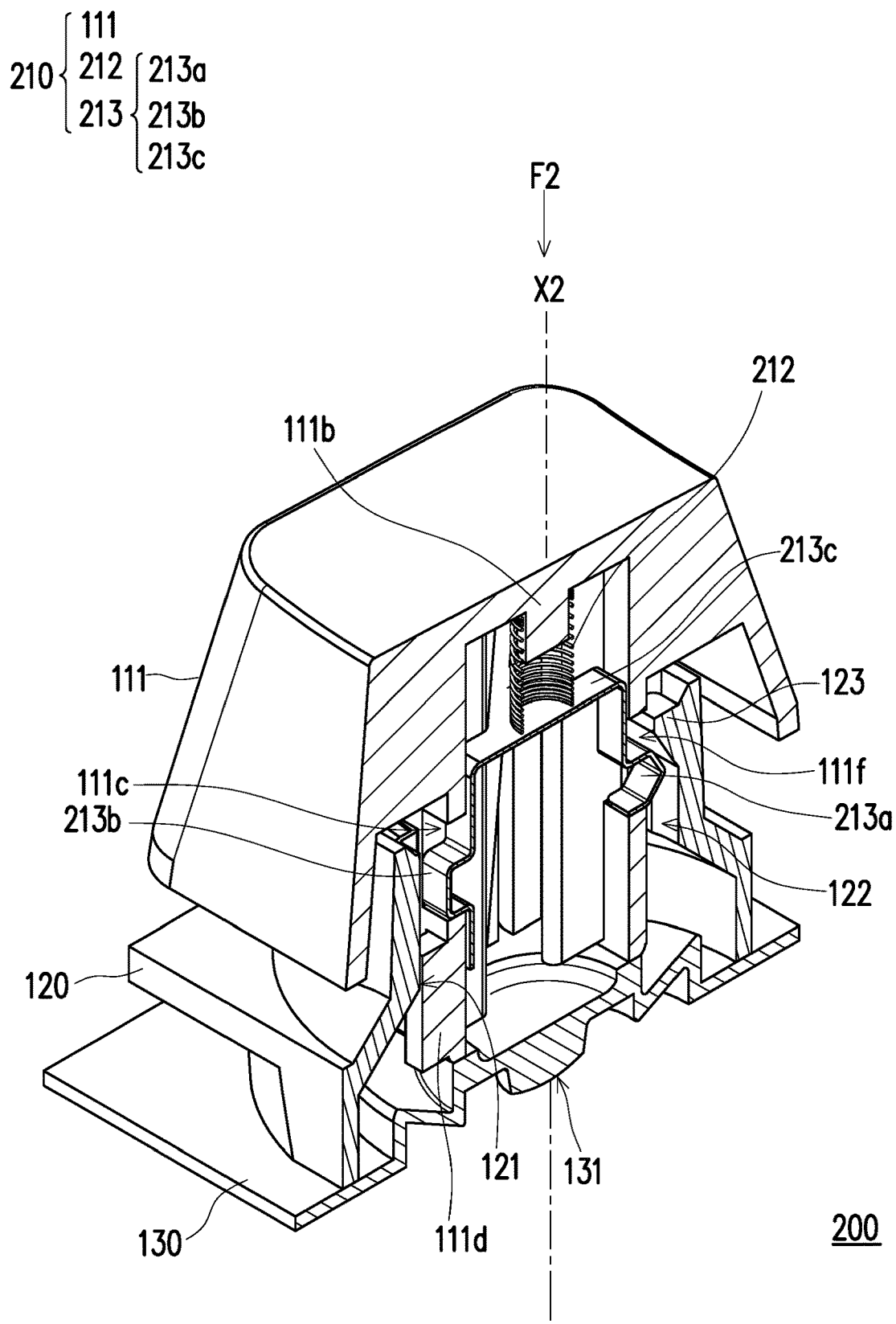

Finally, referring to FIG. 3D and FIG. 3E together, in which a third stroke of the pressing process is shown. At this moment, the external force F1 is continuously applied to the keycap 111, and thus the keycap 111 and the elastic piece 113 are driven by the external force F1 to be moved downward together and press against the elastic member 130 together. Further, by the trigger portion 131 of the elastic member 130, the corresponding electrode points of the membrane assembly 140 abut to each other to make an electric switching contact and the triggered state is reached. At this point, the pressing process of the key structure 100 is completed. After that, since the elastic member 130 has been compressed to the limit at this moment, as mentioned above, once the external force F1 is removed, the elastic member 130, by its elastic restoring force, drives the keycap component 110 to be restored (as shown in FIG. 3A), and the membrane assembly 140 returns to the untriggered state.

Based on the above, in the keycap component 110 of the key structure 100, a movable mechanism including the keycap 111 and the elastic piece 113 and also the spring 112 being served as a driving force between the above two can be combined with the interfering portion 123 of the key housing 120 to form a two-stage stroke structure. Accordingly, in the process of being pressed, the keycap 111 drives the elastic piece 113 to hit the key housing 120 and make a sound, and a clear click feel is provided to the user.

FIG. 4A to FIG. 4E illustrate cross-sectional views of a key structure during a pressing process according to another embodiment. Referring to FIG. 4A to FIG. 4E together, unlike the previous embodiment, in a key structure 200 of the present embodiment, while a keycap component 210 similarly includes the keycap 111, a spring 212 and an elastic piece 213, the elastic piece 213 of the present embodiment comprises an inverted U-shaped structure. That is, a connecting portion 213c of the elastic piece 213 is closer to the convex column 111b of the keycap 111 as compared to the previous embodiment, and the spring 212 abuts between the connecting portion 213c and the convex column 111b. That is, a notch of the elastic piece 213 faces the key housing 120, and the spring 212 is located outside the notch and faces away from the notch. Similarly, a protrusion 213a and an abutting portion 213b have the same effects as their counterparts in the previous embodiment. Also, in the pressing process, the key structure 200 is subjected to an external force F2 along a pressing axial direction X2, wherein the pressing axial direction X2 and the external force F2 are respectively similar to the pressing axial direction X1 and the external force F1 of the previous embodiment, and the details thereof will be omitted herein. In other words, the present embodiment may employ the spring 212 having a shorter length.

In summary, in the key structure of the keyboard, a keycap component including the keycap, the elastic piece and the spring performs a multi-stage stroke when moving relative to the key housing. In brief, in the first stroke, only the keycap is moved, and the elastic piece and the key housing are stopped by interference. Then, in the second stroke, by the elastic restoring force of the spring, the elastic piece is driven to surmount and cross over the interfering portion of the key housing, and the elastic piece is caused to hit the interfering portion and make a sound. Finally, in the third stroke, the keycap component is moved again to press downward against the elastic member, and further, the triggered state is reached through the trigger portion of the elastic member and mutual abutment between the corresponding electrode points of the membrane assembly. Accordingly, the key structure comprises the keycap component having the multi-stage stroke, by which clear click feel and tactile sensation can be provided to the user during the pressing process. Also, significant operational feedback can be provided to the user by a sound made through the elastic piece and the key housing.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A key structure comprising:
a key housing comprising an interfering portion;
a keycap movably assembled to the key housing along a pressing axial direction;
an elastic piece movably assembled to the keycap along the pressing axial direction, the elastic piece comprising a protrusion, the interfering portion being located on a movement path of the protrusion; and
a spring abutting between the keycap and the elastic piece, wherein, the protrusion is stopped at the interfering portion when the keycap is in an initial position, and in a pressing process performed by an external force applied onto the keycap, the keycap is moved relative to the key housing and drives the protrusion to surmount and cross over the interfering portion, so that an elastic restoring force of the elastic piece causes the protrusion to hit the interfering portion and make a sound.

2. A keyboard with a plurality of key structures, each of the key structure as recited in claim 1.

3. The key structure of claim 1, wherein the keycap comprises an accommodation trough and at least one window, the window is a through hole and communicates with the accommodation trough, the elastic piece is movably assembled into the accommodation trough along the pressing axial direction, the protrusion is movably located at the window along the pressing axial direction, and the protrusion protrudes outside the accommodation trough via the window.

4. The key structure of claim 3, wherein the keycap comprises two windows disposed corresponding to each other, the elastic piece is a U-shaped structure, the protrusion is located at one end of the elastic piece, the other end of the elastic piece comprises an abutting portion, the elastic piece is movably assembled into the accommodation trough along the pressing axial direction, and the protrusion and the abutting portion are respectively located at the two windows to move along the pressing axial direction.

5. The key structure of claim 3, wherein the keycap comprises a visor and a hollow column portion, the hollow column portion comprises the accommodation trough and the window, an opening of the accommodation trough faces the key housing, the window faces the visor, and the hollow column portion is movably coupled into the key housing.

6. The key structure of claim 5, wherein the hollow column portion comprises a guiding block, an inner surface of the key housing is provided with a guide slot, and the guiding block is movably coupled to the guide slot.

7. The key structure of claim 6, wherein the hollow column portion comprises a hook extending outward, and the inner surface of the key housing is provided with a stopper, so that in a restoration process, the hook is buckled to the stopper and prevents the keycap from detaching from the key housing, and a direction in which the keycap is moved during the pressing process is opposite to a direction in which the keycap is moved during the restoration process.

8. The key structure of claim 6, wherein the interfering portion is substantially a rib structure spanning above the guide slot.

9. The key structure of claim 5, wherein the protrusion is spaced apart from an upper edge of the window by a first distance when the keycap is in the initial position.

10. The key structure of claim 9, wherein the protrusion includes a first guide inclined surface and a second guide inclined surface that are connected with each other, and a free end of the elastic piece adjacent to the protrusion is bent inward to be substantially parallel to the upper edge of the window.

11. The key structure of claim 9, wherein
in a first stroke of the pressing process, the keycap is moved relative to the key housing by the external force, the protrusion interferes with the interfering portion and stops the elastic piece, the spring is thus compressed and deformed until the upper edge of the window abuts against the protrusion, and the protrusion comprises a second distance relative to a lower edge of the window; and
in a second stroke of the pressing process, the elastic restoring force of the spring is greater than the magnitude of interference force between the protrusion and the interfering portion, thereby driving the protrusion to surmount and cross over the interfering portion.

12. The key structure of claim 11, further comprising:
an elastic member, wherein the key housing covers the elastic member, and the keycap and the elastic piece are disposed corresponding to the elastic member; and
a membrane assembly disposed below the elastic member.

13. The key structure of claim 12, wherein, in a third stroke of the pressing process, the external force continuously drives the keycap and the elastic piece to move together and press against the elastic member until abutting the membrane assembly to make an electric switching contact.

14. The key structure of claim 9, wherein the keycap comprises two windows disposed corresponding to each other, the elastic piece is a U-shaped structure, the protrusion is located at one end of the elastic piece, the other end of the elastic piece comprises an abutting portion, the elastic piece is movably assembled into the accommodation trough along the pressing axial direction, and the protrusion and the abutting portion are respectively located at the two windows to move along the pressing axial direction.

15. The key structure of claim 14, wherein the elastic piece further comprises a connecting portion connecting the protrusion with the abutting portion, and the connecting portion covers a portion of the opening of the accommodation trough.

16. The key structure of claim 15, wherein one end of the spring abuts at the connecting portion and the other end of the spring is sleeved on a convex column of a top inner wall of the keycap.

17. The key structure of claim 15, wherein the abutting portion is to form an interference block at the upper and lower edges of the window during the pressing process.

18. The key structure of claim 17, wherein the abutting portion is a slightly ⊏-shaped structure, and a free end of the elastic piece adjacent to the abutting portion is bent upward and almost adheres to an inner wall of the hollow column portion.

* * * * *